(12) United States Patent
Brand et al.

(10) Patent No.: US 8,386,135 B2
(45) Date of Patent: Feb. 26, 2013

(54) DRIVE SYSTEM AND METHOD OF MONITORING A HYDROSTATIC DRIVE

(75) Inventors: Michael Brand, Ulm (DE); Hubert Stratmann, Roggenburg (DE); Hans-Joachim Vagt, Ulm (DE); Reinhart Rueckert, Kammeltal (DE); Grit Geissler, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 634 days.

(21) Appl. No.: 12/439,885

(22) PCT Filed: Sep. 5, 2007

(86) PCT No.: PCT/EP2007/007747
§ 371 (c)(1),
(2), (4) Date: Mar. 4, 2009

(87) PCT Pub. No.: WO2008/028648
PCT Pub. Date: Mar. 13, 2008

(65) Prior Publication Data
US 2010/0018384 A1 Jan. 28, 2010

(30) Foreign Application Priority Data
Sep. 5, 2006 (DE) .......................... 10 2006 041 549

(51) Int. Cl.
*G05B 19/042* (2006.01)
(52) U.S. Cl. ......................................... 701/50
(58) Field of Classification Search .................... 701/50, 701/1; 137/512.5
See application file for complete search history.

(56) References Cited

U.S. PATENT DOCUMENTS
2009/0133761 A1* 5/2009 Geissler et al. ............ 137/512.5

FOREIGN PATENT DOCUMENTS
| DE | 37 06 325 A1 | 9/1988 |
| DE | 43 27 651 A1 | 2/1995 |
| JP | 10-280488 A | 10/1998 |
| JP | 11-81392 A | 3/1999 |

* cited by examiner

*Primary Examiner* — Christopher J. Novosad
(74) *Attorney, Agent, or Firm* — Scully, Scott, Murphy & Presser, P.C.

(57) ABSTRACT

The invention relates to a drive system and to a method for monitoring a hydrostatic drive (1). The hydrostatic drive (1) has at least one hydrostatic piston engine (2) on which a control unit (6, 6'), which controls the hydrostatic piston engine (2, 2'), is arranged, wherein the control unit (6, 6') is connected to a central control device (13), which controls the drive system (1), via a first interface (14). Control signals for controlling the drive system (1) can be transmitted using the first interface (14). The central control device (13) is additionally connected to the control unit (6) via a second interface (26, 26'), and a switch-off signal can be transmitted from the control unit (6, 6') to the central control device (13) and/or from the central control device (13) to the control unit (6, 6') using the second interface (26, 26').

15 Claims, 2 Drawing Sheets

DRIVE SYSTEM AND METHOD OF MONITORING A HYDROSTATIC DRIVE

BACKGROUND

The invention concerns a drive system and a method of monitoring a hydrostatic drive.

In the design of hydrostatic drives, electronics are increasingly used to control the drives. As is shown in DE 43 27 651 A1, central electronics can be combined with electronic components which are arranged on the hydrostatic machines. This makes it possible to control the hydrostatic drive through the central electronics, each adjustment device which adjusts a particular hydrostatic machine being controlled by the electronics which are arranged locally on this hydrostatic machine. The central electronics and the decentralised control units are connected to each other via one interface in each case. Via this interface, the control signals which the central electronics generate are passed on to the control units of the individual hydrostatic machines. The central electronics also control any further valves which may be required.

In the case of the system proposed in DE 43 27 651 A1, it is disadvantageous that a mutual monitoring function is not provided. Thus if a malfunction occurs, the whole drive is not switched off. In particular, decentralised electronic systems with a distribution of control functions to central electronics and local control units of the hydrostatic machines do not use the potential of risk minimisation by mutual monitoring and switching off in the case of a fault.

SUMMARY

The invention is therefore based on the object of creating a drive system and a method of monitoring a hydrostatic drive, in which the hydrostatic drive is switched off or brought into a safe state if a control fault occurs.

In the case of the drive system according to the invention, with at least one hydrostatic piston engine, a control unit is connected to the hydrostatic piston engine to control it. A central controller is connected to this control unit via a first interface. The central controller transmits control signals to control the hydrostatic drive via the first interface. According to the invention, the central controller and the control unit are connected to each other via at least one second interface, and a switching-off signal can be transmitted from the control unit to the central controller and/or from the central controller to the control units via this second interface. Thus if a malfunction is detected by the control unit, the whole hydrostatic system can be switched off by the central controller, which carries out the central control function, being switched off, and/or the central controller can switch off the control units via an independent switching-off path.

Alternatively, the drive system according to the invention has at least two hydrostatic piston engines, on each of which a control unit to control the piston engine is arranged, the control units being connected to each other via a first interface. The control units are additionally connected to each other via a second interface, via which a switching-off signal can be transmitted from one of the control units to at least one of the other control units.

For mutual monitoring of the control units, the control signals of each control unit are transmitted via the first interface to at least one further first control unit in each case. If a malfunction is detected, a switching-off signal is transmitted from the monitoring control unit to the monitored control unit via a second interface. The monitoring can be done by just one other control unit or by several or all other control units.

According to the invention, the control unit reads in the control signals of the central controller and checks them regarding their plausibility. If the control unit detects an erroneous, i.e. implausible control signal, it outputs a switching-off signal. The control unit transmits the switching-off signal to the central controller, and thus the whole hydrostatic drive is brought to a stop.

The drive system and method of monitoring the hydrostatic drive have the advantage that redundant provision of the electronics of the central controller is unnecessary, Instead, the central controller is monitored by existing control units which are provided on the hydrostatic machines. Such so-called on-board electronic units are provided, in particular, to keep the cabling costs as low as possible. Thus the monitoring can take place in a decentralised manner, via one or more such control units on the hydrostatic machines.

In particular, it is advantageous that the control unit has a first monitoring section, and the central controller has a second monitoring section. Thus within the central controller, internal fault monitoring, on the basis of which the output of control signals can be switched off internally, can be carried out. On the other hand, redundant monitoring of the central controller takes place in the control unit by the first monitoring section, which is arranged there. Thus redundant monitoring of the function of the central controller takes place in the central controller itself and externally in a control unit.

The central controller outputs its control signals via the first interface. These control signals, which are output via the first interface, are checked by the control unit. Specially preferably, the second monitoring section can include an arithmetic unit to simulate the control function of the central controller, it being specially preferred that the simulation is carried out taking account of the same input parameters which are also fed to the central controller. These input parameters are also fed to the control unit, e.g. via the first interface. Using such an arithmetic unit, which simulates the functioning of the central controller, an independent prediction of the control signals output by the central controller is possible. If a deviation by the control signal which the central controller actually outputs from the value obtained on the basis of simulation is detected, it is decided that a malfunction is involved, and accordingly the control unit outputs a switching-off signal.

According to another preferred embodiment, expected values are stored in the first monitoring section of the control unit. Instead of a simulation of the full functions of the central controller, only the control signals which the central controller outputs are checked with respect to agreement with the expected values. This checking requires only a little computing power.

To switch off the central controller, the switching-off signal is preferably output to the central controller so that the power electronics of the central controller can be switched off directly. Thus, even in the case of a malfunction of a central controller central arithmetic unit which carries out the calculation routines in the central controller, the output of control signals to the components of the hydrostatic drive is switched off. If the control signals are switched off, hydrostatic drives are designed so that they always go into a safe operating state.

According to another preferred embodiment, a switching-off signal can also be output via the first interface by the central controller, this further switching-off signal being used to switch off the output of piston engine control signals by the control unit. Thus in reverse, if a fault occurs and is detected by the internal fault monitoring of the central controller, the output of control signals by the control unit to, for instance, an adjustment device of a hydrostatic piston engine can be suppressed.

BRIEF DESCRIPTION OF THE DRAWINGS

A preferred embodiment of a drive system according to the invention for carrying out the method is shown in the drawings and explained in more detail in the following description.

DETAILED DESCRIPTION OF EXEMPLARY EMBODIMENTS

Figure 1:
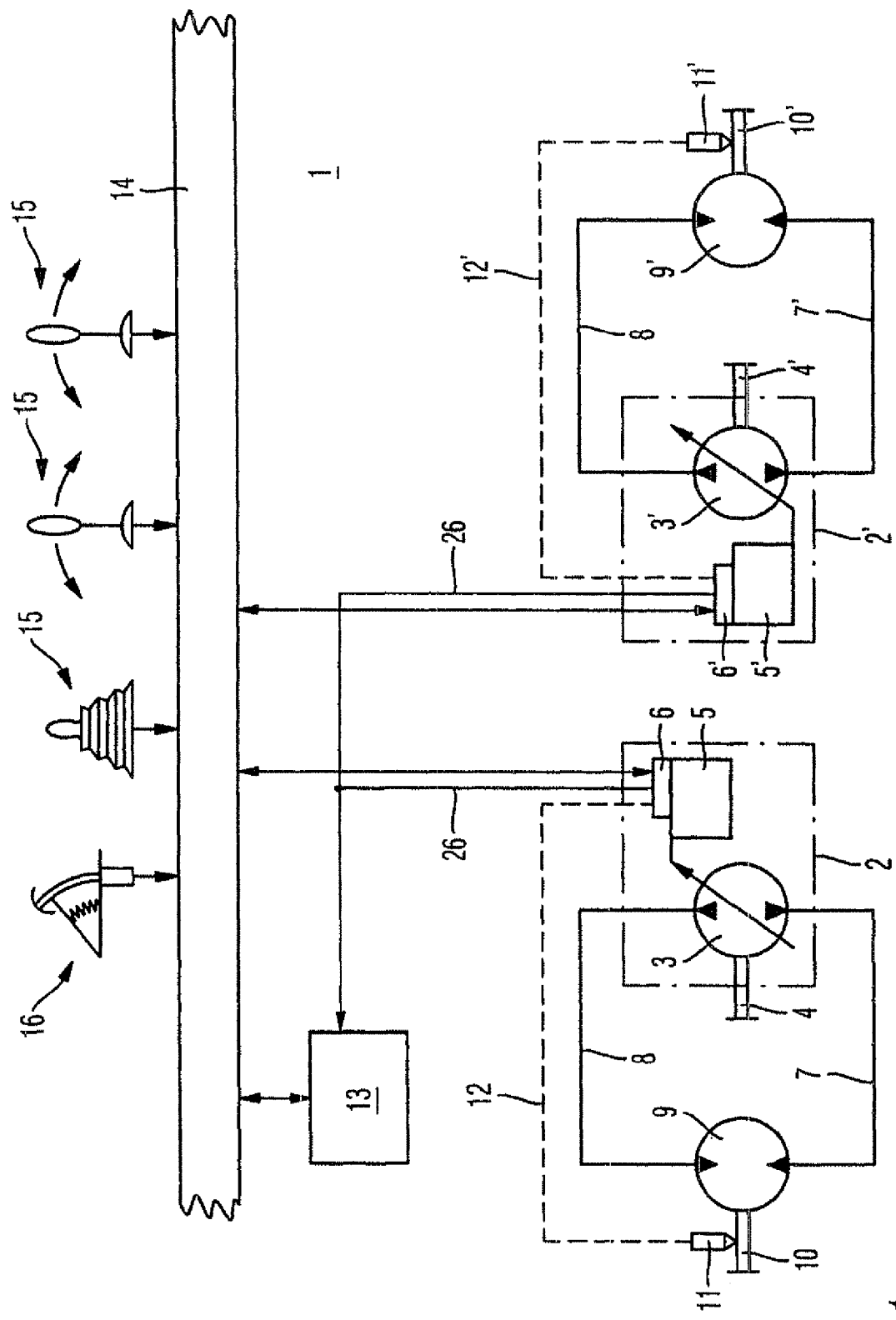
FIG. 1 shows a schematic representation of a drive system according to the invention.

Before the structure of the drive system according to the invention and the procedure flow for monitoring the hydrostatic drive are explained in detail, first, for better understanding of the invention, a hydrostatic drive with its essential components will be explained. For instance, the hydrostatic drive 1 shown in FIG. 1 is intended for driving a tracked vehicle. In the shown embodiment, therefore, the hydrostatic drive 1 comprises two hydrostatic circuits, which in particular are implemented identically. To avoid unnecessary repetition in the explanation, below only one of the two hydrostatic circuits is explained in detail. The corresponding reference symbols referring to the second hydrostatic circuit are marked with a prime.

A hydrostatic circuit of the drive 1 includes a hydraulic pump unit 2. The hydraulic pump unit 2 has a hydraulic pump 3. The hydraulic pump 3 is driven via a drive shaft 4.

The hydraulic pump 3 is designed to convey in two directions, and its conveyed volume is adjustable. To adjust the conveying direction and conveyed volume of the hydraulic pump 3, an adjustment device 5 is provided. The adjustment device 5 acts with an adjustment mechanism of the hydraulic pump 3. To activate the adjustment device 5, a control unit 6 is integrated into the pump unit 2.

Depending on the setting of the adjustment device 5, the hydraulic pump 3 conveys pressurising medium into a first work line 7 or a second work line 8.

The work lines 7, 8 are connected to a hydraulic motor 9. The hydraulic motor 9 drives a drive shaft 10, which for instance is connected, in a way which is not shown, to a chain drive of a tracked vehicle. The rotational speed of the drive shaft 10 is captured via a rotational speed sensor 11, and a corresponding value is reported back via a first sensor line 12 to the control unit 6. In the case of the control system according to the invention for a hydrostatic drive, the control unit 6 controls the adjustment device 5 by piston engine control signals. For this purpose, the control unit 6 passes on piston engine control signals to the corresponding components of the adjustment device 5. These can be, in particular, proportional magnets for setting control and regulation pressures in the hydraulic pump unit 2.

The required setting values in each case were not determined by the control unit 6 alone, but determined in agreement with, for instance, further control units of other hydrostatic piston engines of the hydrostatic drive 1 by a central controller 13, and then transmitted to the control units 6 for implementation.

The central controller 13 communicates with the control unit 6 via a common interface, which in the shown example is a bus system. As the preferred bus system for use in vehicles, a CAN bus 14 is used. Data transmission between the central controller 13 and the control unit 6 is bidirectional, as is denoted in the shown embodiment by the double arrows.

In the central controller 13, a regulation or control algorithm, which calculates the required setting parameters of the hydrostatic drive on the basis of settings of, for instance, operating levers 15, is stored. Corresponding to the calculated setting parameters, the central controller 13 outputs control signals, which are transmitted via the CAN bus 14 to the control unit 6. Via the CAN bus 14, the control unit 6 has access not only to those control signals which concern itself, but also to those control signals with which further components of the hydrostatic drive 1 are controlled. Such further components can be solenoid valves which are not integrated into the pump unit 2, for instance.

The control signals which the central controller 13 outputs are monitored by the at least one control unit 6, and if a fault is present, the control unit 6 outputs a switching-off signal, by which the further output of control signals by the central controller 13 is prevented. Preventing the further output of control signals is also understood to include taking back into a safe state, i.e. the output of null control signals. Such a switching-off signal can either be output by a single control unit 6, or the central controller 13 is monitored by all the control units 6, 6' which are included in the hydrostatic drive. As is shown in FIG. 1, in this case, with appropriate recognition of a faulty control signal of the central controller 13, or another malfunction, each of the control units 6, 6' outputs a switching-off signal.

Figure 2:
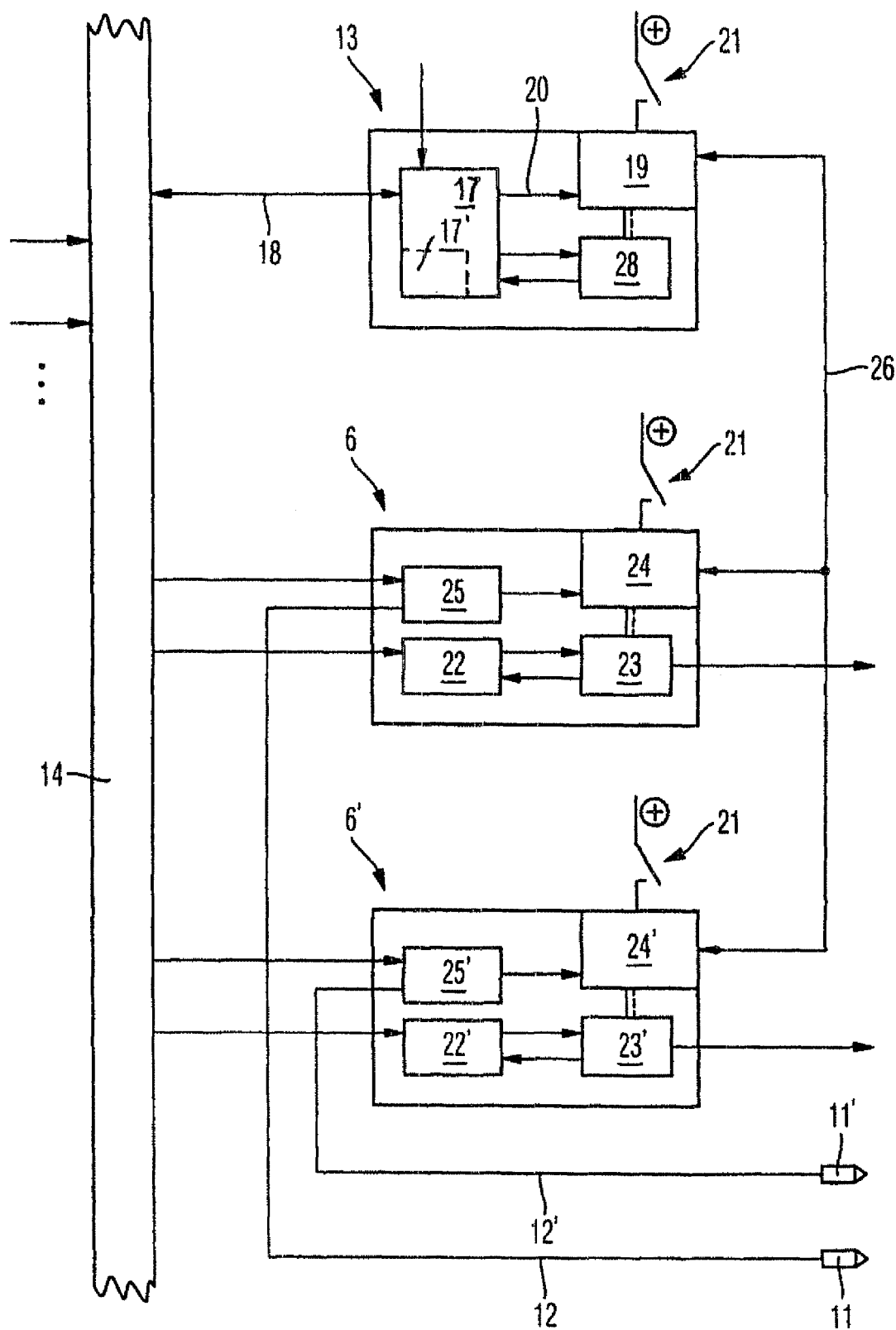
FIG. 2 shows a block diagram to explain the method of monitoring the drive system according to the invention.

In FIG. 2, the structure of the central controller 3 and of the control units 6, 6' is shown schematically. The central controller 13 includes a central arithmetic unit 17. The central arithmetic unit 17 is used to calculate the control signals which the central controller 13 is to output. The necessary information for this purpose is determined, as is shown by the double arrow 18, on the basis of the information which is read in via the CAN bus 14. For this purpose, a control algorithm is stored in the central arithmetic unit 17 of the central controller 13. The control algorithm is a program which determines the setting values of the hydrostatic piston engines on the basis of the read-in system parameters, e.g. the position of an operating lever 15 or of the accelerator pedal 16. By setting different pivoting angles of the hydraulic pump 2 and hydraulic pump 2', for instance in the case of a left/right assignment of the two hydraulic pump units 2, 2', cornering is possible.

The control signals which the central arithmetic unit 17 determines are transmitted to the control unit 6 and/or the control unit 6' via the CAN bus 14. To control further components of the hydrostatic drive 1, the central controller 13 includes power electronics 28, to be able to output the control signals for direct control, for instance of proportional magnets, with sufficient power. The power electronics are connected to an energy supply device 19. The energy supply device 19, as is shown by the arrow 20, can be switched off either via the central arithmetic unit 17 or via an emergency switch 21, which for instance interrupts the energy feed to the energy supply device 19.

The control signals which the central controller 13 outputs are transmitted to the control unit 6 and/or the control unit 6' via the CAN bus 14. The control units 6, 6', of which again only the control unit 6 is described in detail below, each include a control section 22, which prepares the received control signals so that controlling the associated adjustment device 5 of the hydrostatic piston engine by piston engine control signals is possible. For this purpose, the control section 22 is connected to control unit power electronics 23, which prepares the piston engine control signals to be output with sufficient power to control, for instance, proportional magnets.

The control unit power electronics 23 are connected to a control unit energy supply 24. The control unit energy supply 24 is connected on the input side to a first monitoring section 25 of the control unit 6. The first monitoring section 25 of the control unit 6 reads the control signals, which the central controller 13 outputs, via the CAN bus, which forms the first interface between the central controller 13 and the control unit 6, and carries out a plausibility analysis. For checking the control signals for plausibility, for instance expected values for the control signals are stored in the control unit 6. For this purpose, the control unit 6 includes a memory, in which the expected values are stored.

If the control signals which a central controller 13 outputs are read in by the first monitoring section 25, the read-in signal is checked for plausibility by comparison with the expected values. If no corresponding expected values can be found in the memory, it is recognised that the control signal is faulty, and accordingly the hydrostatic drive 1 must be switched off. To switch off the hydrostatic drive 1, the control unit 6 transmits a switching-off signal via a second interface 26 to the central controller 13. The second interface 26 is independent of the first interface, which in the shown embodiment is a CAN bus 14. The independence of the second interface 26 from the first interface ensures that even in the case of a fault which occurs in the CAN bus 14 during data transmission, switching off the hydrostatic system is ensured.

In the shown embodiment, for switching off or for output of the switching-off signal by the first monitoring section 25, the control unit energy supply device 24 is controlled so that a corresponding switching-off signal is output by the control unit energy supply device 24. In the shown embodiment, the switching-off signal is output directly to the energy supply device 19 of the central controller 13. When the energy supply device 19 in the central controller 13 receives the switching-off signal, the energy supply for the power electronics 28 of the central controller 13 is switched off directly. Consequently all output signals are reset, and the hydrostatic drive 1 goes into a safe operating state.

For the central controller 13, which of the control units 6, 6' output a switching-off signal is irrelevant. In addition to switching off the central controller 13 because of a switching-off signal of the control units 6 or 6', it is also possible, in reverse, to prevent the output of piston engine control signals by the control units 6, 6' by means of the central controller 13. In the central controller 13, preferably a second monitoring section 17, through which internal fault monitoring takes place, is integrated in the central arithmetic unit 17. If the internal fault monitoring detects, e.g. on the basis of sensor signals, which enable the hydrostatic drive 1 to react to the output control signals, that a malfunction exists in the hydrostatic drive 1, a further switching-off signal is output and transmitted via the CAN bus 14, i.e. the first interface, to the control unit 6 and/or the control unit 6'. The switching-off signal can apply either generally to all control units 6, 6' which are connected to the CAN bus 14, or selectively to only one control unit 6 or 6'.

According to a preferred embodiment, which allows specially precise capture of control and/or regulation faults, a simulation algorithm is integrated in the first monitoring section 25 of the control unit 6. This simulation algorithm corresponds to the control algorithm which is executed in the central arithmetic unit 17. In connection with this application, the term "control" is understood to mean any control or regulation.

Thus the arithmetic unit of the first monitoring section 25 simulates the function of the central arithmetic unit 17. Since the identical arithmetic operations are executed in the central arithmetic unit 17 of the central controller 13 and in the arithmetic unit of the first monitoring section 25, it is possible and simple to compare the control signal which the central controller 13 outputs with the control signal which is simulated internally in the first monitoring section 25. If deviations are detected here, the control unit 6 outputs the switching-off signal.

The invention is not restricted to the shown embodiment. Individual features of the preferred embodiment can also be combined with each other.

In particular, it can be provided that two control units 6, 6' monitor each other. It is thus possible to increase system safety considerably even without the central controller 13. The function of a control unit 6, 6' is simulated, e.g. by the other control units. To be able to monitor the function of the control units 6, 6', the signals which the control units 6, 6' generate are transmitted to the other control units 6, 6' of the system via the first interface. For this purpose, as in the example which is explained in detail with a central controller 13, the control units 6, 6' are connected via a CAN bus 14. In the case of a malfunction, a control unit 6, 6' is again switched off via the second interface 26 which exists in each case.

In the case of mutual monitoring of control units 6, 6' of the hydrostatic piston engines too, the features of the drive system which is described with respect to implementation with a central controller 13, and of the corresponding method, can be applied analogously.

The invention claimed is:

1. A drive system with at least one hydrostatic piston engine, on which a control unit which controls the at least one hydrostatic piston engine is arranged, the control unit being connected to a central controller which controls the drive system via a first interface, via which control signals to control the drive system are transmitted,
wherein the central controller is additionally connected via a second interface to the control unit, and via the second interface a switching-off signal is transmitted from the control unit to the central controller when the control unit detects an implausible control signal of the central controller.

2. The drive system according to claim 1, wherein the control unit has a first monitoring section, and the central controller has a second monitoring section.

3. The drive system according to claim 2, wherein the control signals which the central controller outputs are checked by the first monitoring section of the control unit.

4. The drive system according to claim 2, wherein the first monitoring section of the control unit includes an arithmetic unit, for simulating control functions of the central controller.

5. The drive system according to claim 2, wherein the first monitoring section includes a memory, in which expected values are stored, and the first monitoring section compares control signals which the central controller outputs with the expected values.

6. The drive system according to claim 1, wherein power electronics of the central controller are switched off by the switching-off signal.

7. The drive system according to claim 1, wherein via the first interface, the central controller transmits a further switching-off signal to the control unit, the further switching-off signal being able to switch off output of piston engine control signals by the control unit.

8. The drive system according to claim 7, wherein the control unit has power electronics to control the at least one hydrostatic piston engine, and the power electronics are switched off by the switching-off signal which is transmitted via the second interface.

9. The drive system according to claim 1, wherein a bus system is provided to form the first interface.

10. The drive system according to claim 1, wherein via the second interface a switching-off signal is transmitted from the central controller to the control unit.

11. A method of monitoring a drive system comprising at least one hydrostatic piston engine, at least one control unit arranged on the at least one hydrostatic piston engine for controlling the at least one hydrostatic piston engine, and a central controller for controlling the drive system, the at least one control unit and the central controller being connected via a first interface, the method comprising:
- the at least one control unit reading in control signals which the central controller outputs;
- the at least one control unit checking the control signals;
- the at least one control unit outputting a switching-off signal via a second interface to the central controller if an implausible control signal is present.

12. The method according to claim 11, wherein the at least one control unit simulates a control function of the central controller, and compares a simulation result with a read-in control signal.

13. The method according to claim 11, wherein the read-in control signals are compared by the at least one control unit with expected values which are stored in the at least one control unit.

14. The method according to claim 11, wherein the switching-off signal switches off power electronics of the central controller.

15. The method according to claim 11, wherein in the central controller, internal fault monitoring is carried out, and if a fault is detected, the central controller outputs a further switching-off signal to switch off power electronics of the at least one control unit.

* * * * *